(12) United States Patent
Shimizu et al.

(10) Patent No.: US 9,899,654 B2
(45) Date of Patent: Feb. 20, 2018

(54) METAL-AIR BATTERY

(71) Applicant: Hitachi Zosen Corporation, Osaka (JP)

(72) Inventors: Takehiro Shimizu, Osaka (JP); Masanobu Aizawa, Osaka (JP); Sousuke Nishiura, Osaka (JP); Kazuya Kameyama, Osaka (JP)

(73) Assignee: HITACHI ZOSEN CORPORATION (JP)

( * ) Notice: Subject to any disclaimer, the term of this patent is extended or adjusted under 35 U.S.C. 154(b) by 183 days.

(21) Appl. No.: 14/779,206

(22) PCT Filed: Mar. 17, 2014

(86) PCT No.: PCT/JP2014/057119
§ 371 (c)(1),
(2) Date: Sep. 22, 2015

(87) PCT Pub. No.: WO2014/156763
PCT Pub. Date: Oct. 2, 2014

(65) Prior Publication Data
US 2016/0072114 A1    Mar. 10, 2016

(30) Foreign Application Priority Data

Mar. 29, 2013    (JP) ................. P2013-071051

(51) Int. Cl.
| | | |
|---|---|---|
| *H01M 2/26* | (2006.01) | |
| *H01M 12/06* | (2006.01) | |
| *H01M 12/08* | (2006.01) | |

(52) U.S. Cl.
CPC ............ *H01M 2/26* (2013.01); *H01M 12/06* (2013.01); *H01M 12/08* (2013.01); *Y02E 60/128* (2013.01)

(58) Field of Classification Search
CPC ...... H01M 12/06; H01M 12/08; H01M 8/004; H01M 2/26
USPC ................................. 429/402–407
See application file for complete search history.

(56) References Cited

U.S. PATENT DOCUMENTS

| | | | | |
|---|---|---|---|---|
| 3,969,144 | A | 7/1976 | Zaromb .................... | 136/86 |
| 2007/0048578 | A1* | 3/2007 | Tokoi ................... | H01M 8/004 |
| | | | | 429/466 |
| 2007/0141440 | A1 | 6/2007 | Yang et al. ................. | 429/38 |
| 2009/0092894 | A1* | 4/2009 | Kim ....................... | H01M 2/023 |
| | | | | 429/160 |
| 2009/0202876 | A1 | 8/2009 | Shimamura et al. ........... | 429/21 |
| 2012/0034520 | A1* | 2/2012 | Lu ........................... | H01M 2/08 |
| | | | | 429/209 |
| 2013/0078535 | A1 | 3/2013 | Aizawa ........................ | 429/403 |
| 2015/0111113 | A1 | 4/2015 | Kameyama et al. | |

FOREIGN PATENT DOCUMENTS

| | | |
|---|---|---|
| JP | H 09-50828 | 2/1997 |
| JP | H 09-289045 | 11/1997 |
| JP | H 11-191440 | 7/1999 |
| JP | 2006-142275 | 6/2006 |
| JP | 2011-253789 | 12/2011 |
| JP | 2013-222610 | 10/2013 |
| WO | WO 2011/152464 A1 | 12/2011 |
| WO | WO 2013/161253 | * 10/2013 |

OTHER PUBLICATIONS

Ong, K.P., Wu, P., Liu, L., Jiang, S.P.—Optimization of electrical conductivity of LaCrO3 through doping: A combined study of molecular modeling and experiment, Applied Physics Letters, 90, 044109, pp. 1-3, 2007.*
PCT/IB/326 Notification Concerning Transmittal of International Preliminary Report on Patentability including PCT/IB373 and PCT/ISA/237 for corresponding PCT/JP2014/057119 in Janpanese, dated Oct. 8, 2015.
PCT/IB/338 Notification of Transmittal of Translation of the International Preliminary Report on Patentability including PCT/IB/373 and PCT/ISA/237 for corresponding PCT/JP2014/057119 in English, dated Oct. 8, 2015.
Takeo Hyodo et al., "Investigation of Materials for Gas Diffusion-Type Oxygen Cathode Aiming at Electric Power-Saving Brine Electrolysis", Electrochemistry, vol. 62(2), 158-164 (1994) with English translation of Section 3.3.

* cited by examiner

*Primary Examiner* — Anca Eoff
(74) *Attorney, Agent, or Firm* — Osterlenk Faber LLP

(57) ABSTRACT

In a metal-air battery (1), an interconnector (24) formed of ceramic having alkali resistance is provided on the surface of a porous positive electrode layer (2) on the side opposite to the surface that is in contact with an electrolyte layer (4). A liquid repellent layer (29) having liquid repellency to an electrolyte solution is further provided on the surface of the positive electrode layer (2) on which the interconnector (24) is formed, and covers this surface along with the interconnector (24). The metal-air battery (1) using an alkaline electrolyte solution can thus easily prevent leakage of the electrolyte solution by the interconnector (24) and the liquid repellent layer (29) while suppressing degradation of the interconnector (24).

8 Claims, 5 Drawing Sheets

|    | THICKNESS (μm) | WIDTH (mm) | θ (°) | CRACKING | SURFACE SMOOTHNESS |
|----|----------------|------------|-------|----------|--------------------|
| A1 | 37             | 6          | 38    | ○        | △                  |
| A2 | 45             | 6          | 38    | ○        | ○                  |
| A3 | 310            | 6          | 38    | ○        | ○                  |
| A4 | 41             | 0.02       | 0.1   | ○        | ○                  |
| A5 | 54             | 28         | 180   | ○        | ○                  |
| A6 | 20             | 6          | 38    | ○        | ×                  |
| A7 | 373            | 6          | 38    | ×        | ○                  |

FIG. 5

| | RAW MATERIAL | THICKNER | VISCOSITY | 2W/A | FIRING TEMPERATURE | HOLDING TIME | RATE OF TEMPERATURE INCREASE | GAS PERMEABILITY | ANTI-WATER PRESSURE CHARACTERISTICS | PRESENCE OR ABSENCE OF CRACKING AND DELAMINATION |
|---|---|---|---|---|---|---|---|---|---|---|
| B1 | 10 PARTS BY WEIGHT | 0 PARTS BY WEIGHT | 5.7 | 0.33 | 260°C | 3MIN | 1.5°C/MIN | ○ | △ | ○ |
| B2 | 20 PARTS BY WEIGHT | 0 PARTS BY WEIGHT | 4.9 | 0.33 | 260°C | 3MIN | 1.5°C/MIN | △ | ○ | ○ |
| B3 | 40 PARTS BY WEIGHT | 0 PARTS BY WEIGHT | 8.8 | 0.33 | 260°C | 3MIN | 1.5°C/MIN | △ | ○ | ○ |
| B4 | 20 PARTS BY WEIGHT | 0.5 PARTS BY WEIGHT | 10 | 0.33 | 260°C | 3MIN | 1.5°C/MIN | △ | ◎ | ○ |
| B5 | 20 PARTS BY WEIGHT | 1 PARTS BY WEIGHT | 26 | 0.33 | 260°C | 3MIN | 1.5°C/MIN | ○ | ○ | ○ |
| B6 | 20 PARTS BY WEIGHT | 2 PARTS BY WEIGHT | 81 | 0.33 | 260°C | 3MIN | 1.5°C/MIN | ◎ | ◎ | ○ |
| B7 | 20 PARTS BY WEIGHT | 3 PARTS BY WEIGHT | 312 | 0.33 | 260°C | 3MIN | 1.5°C/MIN | ◎ | △ | ○ |
| B8 | 20 PARTS BY WEIGHT | 4 PARTS BY WEIGHT | 966 | 0.33 | 260°C | 3MIN | 1.5°C/MIN | △ | △ | ○ |
| B9 | 20 PARTS BY WEIGHT | 3 PARTS BY WEIGHT | 312 | 0.33 | 160°C | 180MIN | 1.5°C/MIN | △ | △ | ○ |
| B10 | 20 PARTS BY WEIGHT | 3 PARTS BY WEIGHT | 312 | 0.33 | 180°C | 180MIN | 1.5°C/MIN | ◎ | ◎ | ○ |
| B11 | 20 PARTS BY WEIGHT | 3 PARTS BY WEIGHT | 312 | 0.33 | 260°C | 60MIN | 1.5°C/MIN | ◎ | △ | ○ |
| B12 | 20 PARTS BY WEIGHT | 3 PARTS BY WEIGHT | 312 | 0.33 | 260°C | 90MIN | 1.5°C/MIN | ◎ | △ | ○ |
| B13 | 20 PARTS BY WEIGHT | 3 PARTS BY WEIGHT | 312 | 0.33 | 260°C | 120MIN | 1.5°C/MIN | ◎ | △ | ○ |
| B14 | 20 PARTS BY WEIGHT | 3 PARTS BY WEIGHT | 312 | 0.33 | 320°C | 3MIN | 1.5°C/MIN | ◎ | △ | ○ |
| B15 | 20 PARTS BY WEIGHT | 3 PARTS BY WEIGHT | 312 | 0.33 | 330°C | 3MIN | 1.5°C/MIN | ◎ | △ | ○ |
| B16 | 20 PARTS BY WEIGHT | 3 PARTS BY WEIGHT | 312 | 0.03 | 260°C | 3MIN | 1.5°C/MIN | ◎ | ◎ | ○ |
| B17 | 20 PARTS BY WEIGHT | 3 PARTS BY WEIGHT | 312 | 0.17 | 260°C | 3MIN | 1.5°C/MIN | ◎ | ◎ | ○ |
| B18 | 20 PARTS BY WEIGHT | 3 PARTS BY WEIGHT | 312 | 0.67 | 260°C | 3MIN | 1.5°C/MIN | ◎ | ◎ | ○ |
| B19 | 20 PARTS BY WEIGHT | 3 PARTS BY WEIGHT | 312 | 0.83 | 260°C | 3MIN | 1.5°C/MIN | ◎ | ◎ | ○ |
| B20 | 20 PARTS BY WEIGHT | 3 PARTS BY WEIGHT | 312 | 0.33 | 260°C | 3MIN | 3.8°C/MIN | ◎ | ◎ | ○ |
| B21 | 20 PARTS BY WEIGHT | 3 PARTS BY WEIGHT | 312 | 0.33 | 260°C | 3MIN | 10°C/MIN | ○ | × | ○ |
| B22 | 5 PARTS BY WEIGHT | 0 PARTS BY WEIGHT | 5.5 | 0.33 | 260°C | 3MIN | 1.5°C/MIN | × | ○ | ○ |
| B23 | 45 PARTS BY WEIGHT | 0 PARTS BY WEIGHT | 9.6 | 0.33 | 260°C | 3MIN | 1.5°C/MIN | × | × | ○ |
| B24 | 20 PARTS BY WEIGHT | 3 PARTS BY WEIGHT | 312 | 0.33 | 150°C | 180MIN | 1.5°C/MIN | ◎ | × | ○ |
| B25 | 20 PARTS BY WEIGHT | 3 PARTS BY WEIGHT | 312 | 0.33 | 340°C | 3MIN | 1.5°C/MIN | ◎ | × | ○ |
| B26 | 20 PARTS BY WEIGHT | 3 PARTS BY WEIGHT | 312 | 0.01 | 260°C | 3MIN | 1.5°C/MIN | ◎ | × | × |
| B27 | 20 PARTS BY WEIGHT | 3 PARTS BY WEIGHT | 312 | 0.90 | 260°C | 3MIN | 1.5°C/MIN | ◎ | ◎ | ○ |

METAL-AIR BATTERY

The present application is a 35 U.S.C. § § 371 national phase conversion of PCT/JP2014/057119, filed Mar. 17, 2014, which claims priority to Japanese Patent Application No. P2013-071051, filed Mar. 29, 2013, the contents of both of which are incorporated herein by reference. The PCT International Application was published in the Japanese language.

TECHNICAL FIELD

The present invention relates to a metal-air battery.

BACKGROUND ART

Metal-air batteries using a metal as an active material of the negative electrode and using oxygen in the air as an active material of the positive electrode are conventionally known. For example, Japanese Patent Application Laid-Open No. 2012-104273 (Document 1) discloses a generally cylindrical metal-air battery having a negative electrode disposed on its outer circumference and a porous positive electrode disposed on its inner circumference. On the positive electrode of the metal-air battery of Document 1 is provided a liquid repellent layer having liquid repellency to an electrolyte solution contained in an electrolyte layer, thus preventing permeation and leakage of the electrolyte solution through the porous positive electrode. Japanese Patent Application Laid-Open No. H9-289045 discloses a cylindrical air cell having a nickel net as a current collector.

Note that "Investigation of Materials for Gas Diffusion-Type Oxygen Cathode Aiming at Electric Power-Saving Brine Electrolysis" by Takeo HYODO et al. (Electrochemistry, Electrochemical Society of Japan, 1994, vol. 62(2), pp. 158-164) describes perovskite type oxides having alkali resistance, such as $LaSrCoFeO_3$, $LaSrMnFeO_3$, $LaMnO_3$, and $LaNiO_3$.

Incidentally, in the metal-air batteries using an alkaline electrolyte solution and having a porous positive electrode layer, the current collector of the positive electrode layer is required to have high alkali resistance as well as preventing leakage of the electrolyte solution through the positive electrode layer. Also, since oxygen is produced in the positive electrode layer during charging, the current collector of the positive electrode layer also needs to prevent degradation due to oxygen. Thus, a technique for easily preventing leakage of an electrolyte solution while suppressing degradation of the current collector is required for metal-air batteries using an alkaline electrolyte solution.

SUMMARY OF INVENTION

The present invention is intended for a metal-air battery, and it is an object of the present invention to easily prevent leakage of an electrolyte solution while suppressing degradation of a current collector in a metal-air battery that uses an alkaline electrolyte solution.

The metal-air battery according to the present invention includes a negative electrode layer, a porous positive electrode layer that opposes the negative electrode layer, an electrolyte layer disposed between the negative electrode layer and the positive electrode layer and containing an alkaline electrolyte solution, an interconnector formed of ceramic having alkali resistance and provided on a surface of the positive electrode layer on a side opposite to a surface of the positive electrode layer that is in contact with the electrolyte layer, and a liquid repellent layer having liquid repellency to the electrolyte solution and covering, along with the interconnector, the surface of the positive electrode layer on which the interconnector is provided.

According to the present invention, the metal-air battery using the alkaline electrolyte solution can easily prevent leakage of the electrolyte solution by the interconnector and the liquid repellent layer while suppressing degradation of the interconnector.

In a preferred embodiment of the present invention, the ceramic forming the interconnector has electrical conductivity of one siemens per centimeter or greater.

In another preferred embodiment of the present invention, the liquid repellent layer is formed to have a porous structure by applying fine particles of fluororesin to the surface of the positive electrode layer on which the interconnector is provided and by firing the fine particles at a processing temperature that is higher than or equal to a temperature lower by 100° C. than a melting point of the fine particles and that is lower than or equal to a temperature higher by 70° C. than the melting point.

In a preferable metal-air battery, the liquid repellent layer covers an edge portion of the interconnector. Thus, leakage of the electrolyte solution can more reliably be prevented.

These and other objects, features, aspects and advantages of the present invention will become more apparent from the following detailed description of the present invention when taken in conjunction with the accompanying drawings.

BRIEF DESCRIPTION OF DRAWINGS

FIG. 4 illustrates evaluation results for the interconnector; and

FIG. 5 illustrates evaluation results for a liquid repellent layer.

DESCRIPTION OF EMBODIMENTS

Figure 1:
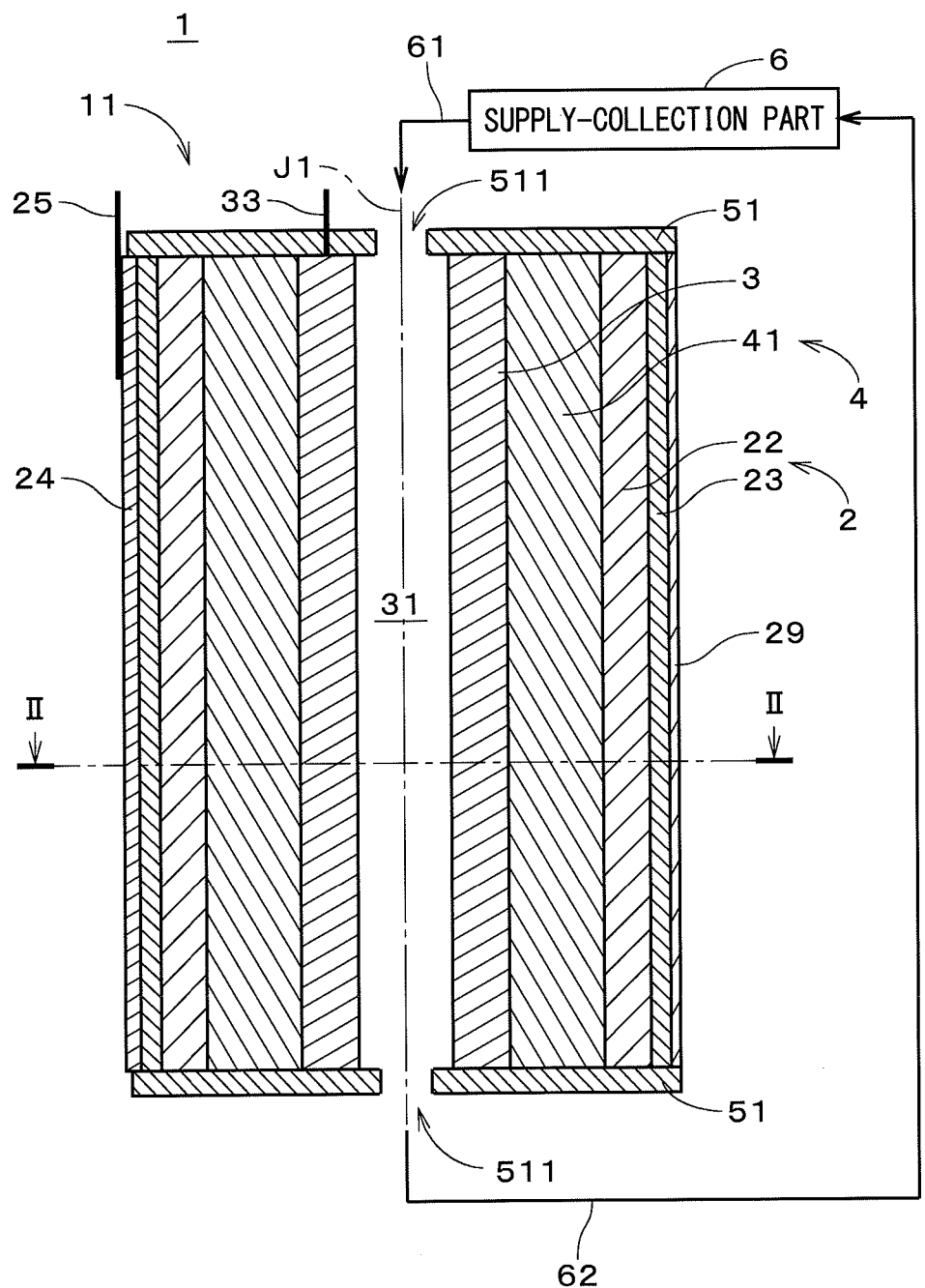
FIG. 1 illustrates a structure of a metal-air battery.
Figure 2:
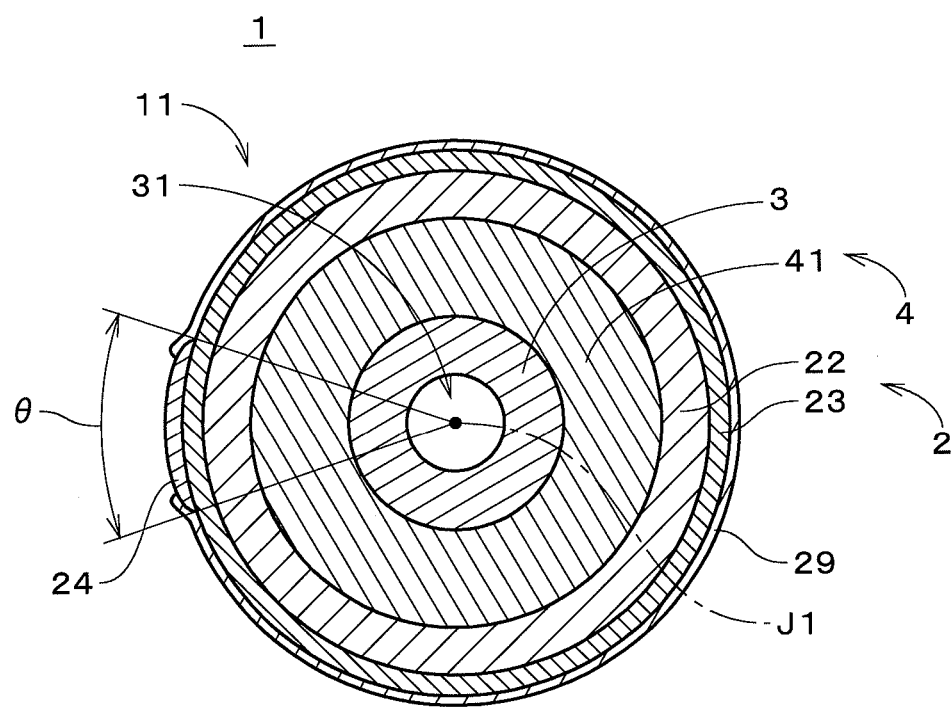
FIG. 2 is a transverse cross-sectional view of the metal-air battery.

FIG. 1 illustrates a structure of a metal-air battery 1 according to an embodiment of the present invention. A main body 11 of the metal-air battery 1 has a generally cylindrical shape centered on a central axis J1. FIG. 1 illustrates a cross section of the main body 11, including the central axis J1. FIG. 2 is a transverse cross-sectional view of the main body 11 of the metal-air battery 1, taken along a position II-II in FIG. 1. As illustrated in FIGS. 1 and 2, the metal-air battery 1 is a secondary battery that includes a positive electrode layer 2, a negative electrode layer 3, and an electrolyte layer 4, and the negative electrode layer 3, the electrolyte layer 4, and the positive electrode layer 2 are concentrically disposed in the order, radially outward from the central axis J1.

The negative electrode layer 3 (also referred to as a "metal electrode") is a tubular porous member centered on the central axis J1 and is formed of a metal such as magnesium (Mg), aluminum (Al), zinc (Zn), or iron (Fe) or an alloy that contains any of these metals. In the present embodiment, the negative electrode layer 3 is formed of zinc and has a cylindrical shape having an outer diameter of 11 millimeters (mm) and an inner diameter of 5 mm when fully charged. As illustrated in FIG. 1, a negative electrode current collector terminal 33 is connected to an end of the negative electrode layer 3 in the direction of the central axis J1. As illustrated in FIGS. 1 and 2, a space 31 (hereinafter, referred to as a "filled part 31") surrounded by the inner surface of the negative electrode layer 3 is filled with an electrolyte solution (also called an "electrolytic solution").

On the outer side of the negative electrode layer 3, the electrolyte layer 4 is provided to surround the negative electrode layer 3. The electrolyte layer 4 includes a tubular porous member 41, and the inner surface of the porous member 41 opposes the outer surface of the negative electrode layer 3. A gap of approximately 0.5 mm is preferably provided between the negative electrode layer 3 and the porous member 41. The electrolyte layer 4 is in communication with the filled part 31 through the pores of the porous negative electrode layer 3, and the porous member 41 is also filled with the electrolyte solution. The porous member 41 is formed of, for example, ceramic, a metal, an inorganic material, or an organic material and is preferably a sintered body of ceramic (i.e., integrally molded ceramic) having high insulating properties, such as alumina, zirconia, or hafnia. From the viewpoint of preventing an increase in the distance between the negative electrode layer 3 and the positive electrode layer 2 described later while securing a certain degree of mechanical strength, the thickness of the porous member 41 is preferably greater than or equal to 0.5 mm and less than or equal to 4 mm. The electrolyte solution in the present embodiment is a high-concentration aqueous alkaline solution (e.g., 8 mol/L (M) aqueous potassium hydroxide (KOH) solution) that is saturated with zinc oxide as necessary.

The positive electrode layer 2 (also referred to as an "air electrode") includes a porous positive electrode conductive layer 22. The positive electrode conductive layer 22 is formed (laminated) on the outer surface of the porous member 41 of the electrolyte layer 4 and has a tubular shape. In other words, the positive electrode conductive layer 22 of the positive electrode layer 2 opposes the negative electrode layer 3, and the electrolyte layer 4 containing the electrolyte solution is disposed between the positive electrode conductive layer 22 and the negative electrode layer 3. A positive electrode catalyst is supported on the outer surface of the positive electrode conductive layer 22, forming a positive electrode catalyst layer 23. On part of the outer surface of the positive electrode catalyst layer 23, an interconnector 24 formed of ceramic having alkali resistance is provided. The thickness of the interconnector 24 is in a range of, for example, approximately 30 to 300 micrometers (μm). The interconnector 24 is connected to a positive electrode current collector terminal 25. The details of the interconnector 24 will be described later.

Figure 3:
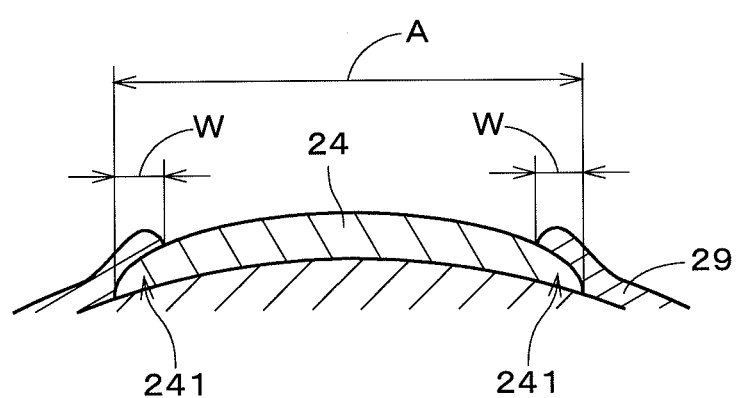
FIG. 3 is an enlarged view of the vicinity of an interconnector.

On a region of the outer surface of the positive electrode catalyst layer 23 that is not covered with the interconnector 24, a porous layer formed of a material having water repellency is formed as a liquid repellent layer 29. To be more specific, as illustrated in FIG. 3 which is an enlarged view of the vicinity of the interconnector 24, opposite edge portions 241 (hereinafter, referred to as "edge portions 241") of the interconnector 24 in the circumferential direction centered on the central axis J1 are covered with the liquid repellent layer 29.

From the viewpoint of preventing degradation due to oxidation during charging, which will be described later, the positive electrode conductive layer 22 preferably does not contain carbon (the same applies to the interconnector 24). In the present embodiment, the positive electrode conductive layer 22 is a thin porous conductive film formed primarily from a perovskite type oxide having electrical conductivity (e.g., LSCF ($LaSrCoFeO_3$)). This positive electrode conductive layer 22 is formed by coating the outer surface of the porous member 41 with a perovskite type oxide by slurry coating and then firing the perovskite type oxide. The above positive electrode conductive layer 22 may be formed by other methods such as hydrothermal synthesis, chemical vapor deposition (CVD), and physical vapor deposition (PVD).

The positive electrode catalyst layer 23 is formed of a catalyst that accelerates oxygen reduction reactions, and examples of the catalyst include metal oxides such as manganese (Mn), nickel (Ni), and cobalt (Co) and perovskite type oxides such as LSMF ($LaSrMnFeO_3$) and LSMCF ($LaSrMnCoFeO_3$). In the present embodiment, the positive electrode catalyst layer 23 is formed by coating the outer surface of the positive electrode conductive layer 22 with a perovskite type oxide by slurry coating, firing the perovskite type oxide, and then preferentially supporting manganese dioxide ($MnO_2$) or the like by hydrothermal synthesis. Alternatively, the positive electrode catalyst layer 23 may be formed by other methods such as CVD or PVD. In the metal-air battery 1, in principle, an interface between the air and the electrolyte solution is formed in the vicinity of the porous positive electrode catalyst layer 23.

As illustrated in FIG. 1, disk-shaped closure members 51 are fixed to opposite end faces (top and bottom end faces in FIG. 1) of the negative electrode layer 3, the electrolyte layer 4, and the positive electrode layer 2 in the direction of the central axis J1. Each closure member 51 has a through hole 511 in the center, and the through hole 511 opens into the filled part 31. In the metal-air battery 1, the liquid repellent layer 29 and the closure members 51 prevent the electrolyte solution in the main body 11 from leaking to the outside other than through the through holes 511.

One end of a supply pipe 61 is connected to the through hole 511 of one of the closure members 51, and the other end of the supply pipe 61 is connected to a supply-collection part 6. One end of a collection pipe 62 is connected to the through hole 511 of the other closure member 51, and the other end of the collection pipe 62 is connected to the supply-collection part 6. The supply-collection part 6 includes a reservoir tank for the electrolyte solution and a pump and is capable of collecting the electrolyte solution contained in the filled part 31 into the reservoir tank at a flow rate (volume per unit time) instructed by a control part (not shown) and supplying the electrolyte solution contained in the reservoir tank to the filled part 31 at the same flow rate. That is, the electrolyte solution can be circulated between the filled part 31 and the reservoir tank of the supply-collection part 6. The supply-collection part 6 is provided with a filter, and unwanted materials contained in the electrolyte solution are removed by the filter during circulation of the electrolyte solution.

In the metal-air battery 1 of the present embodiment, the central axis J1 of the main body 11 is parallel to the vertical direction (the direction of gravity), and the through hole 511 connected to the collection pipe 62 is located lower in the vertical direction than the through hole 511 connected to the supply pipe 61. The supply pipe 61 and the collection pipe 62 are respectively provided with a supply valve and a collection valve (not shown). In the present exemplary operation, the electrolyte solution is circulated at a constant flow velocity during normal operation. Note that the supply valve and the collection valve can be regarded as part of the supply-recovery part 6. The central axis J1 of the metal-air battery 1 does not necessarily have to be parallel to the vertical direction, and for example, the metal-air battery 1 may be located such that the central axis J1 is parallel to the horizontal direction.

When the metal-air battery 1 in FIG. 1 is discharged, the negative electrode current collector terminal 33 and the positive electrode current collector terminal 25 are electrically connected to each other via a load (e.g., lighting fitting). The metal contained in the negative electrode layer 3 is oxidized to generate metal ions, and electrons are supplied to the positive electrode layer 2 through the negative electrode current collector terminal 33, the load, the positive electrode current collector terminal 25, and the interconnector 24. In the porous positive electrode layer 2, oxygen in the air that has permeated through the liquid repellent layer 29 is reduced by electrons supplied from the negative electrode layer 3 and eluted in the electrolyte solution as hydroxide ions (OH—). In the positive electrode layer 2, the positive electrode catalyst accelerates the reduction reaction of oxygen.

On the other hand, when the metal-air battery 1 is charged, a voltage is applied between the negative electrode current collector terminal 33 and the positive electrode current collector terminal 25, so that electrons are supplied from the hydroxide ions (OH—) to the positive electrode layer 2 and oxygen is produced. In the negative electrode layer 3, metals ions are reduced by the electrons supplied through the interconnector 24 and the positive electrode current collector terminal 25 to the negative electrode current collector terminal 33, and a metal is deposited on the surface. In the positive electrode layer 2, the positive electrode catalyst contained in the positive electrode catalyst layer 23 accelerates the production of oxygen.

As described previously, in the metal-air battery 1, the supply-collection part 6 circulates the electrolyte solution, and the electrolyte solution (which is mostly the electrolyte solution contained in the filled part 31 but includes a slight amount of the electrolyte solution contained in the negative electrode layer 3 and the electrolyte layer 4) in the vicinity of the through hole 511 located at a lower level (hereinafter, also referred to as the "lower through hole 511") is collected through the through hole 511. Part of the electrolyte solution supplied into the filled part 31 through the through hole 511 located at a higher level (hereinafter, also referred to as the "upper through hole 511") is diffused also in the electrolyte layer 4 (porous member 41) through the pores of the negative electrode layer 3. In this way, the electrolyte solution supplied from the supply-collection part 6 is also mixed into the electrolyte layer 4. Through this, the electrolyte solution contained in the electrolyte layer 4 is slowly replaced by the electrolyte solution contained in the reservoir tank of the supply-collection part 6 during charging or discharging of the metal-air battery 1.

In the metal-air battery 1, the sequential operation of collecting a predetermined amount of electrolyte solution through the lower through hole 511 and supplying the same amount of electrolyte solution through the upper through hole 511 may be repeatedly performed. Through this, the electrolyte solution contained in the electrolyte layer 4 is replaced by the electrolyte solution contained in the reservoir tank of the supply-collection part 6 during charging or discharging. Alternatively, it is also possible to intermittently replace the electrolyte solution. For example, after the electrolyte solution is circulated for a predetermined period of time, the supply valve and the collection valve may be closed to stop the collection and supply of the electrolyte solution until the newly diffused electrolyte solution enters an equilibrium state. This allows replacement of the electrolyte solution in the main body 11 (mixture of the deteriorated electrolyte solution and the fresh electrolyte solution) during charging or discharging. It is of course possible to stop charging or discharging to replace the electrolyte solution in the main body 11. Note that the electrolyte solution may be supplied through the lower through hole 511 into the filled part 31 and collected through the upper through hole 511. In this case, the metal-air battery 1 can reliably be filled with the electrolyte solution.

Next, the interconnector 24 will be described in detail. The interconnector 24 is formed by firing ceramic particles, such as metal oxides, that have alkali resistance and high conductivity. For example, the ceramic forming the interconnector 24 preferably has electrical conductivity of one siemens per centimeter (S/cm) or greater (e.g., 10000 S/cm or less) at ambient temperature (27° C.). Examples of such ceramic include perovskite type oxides expressed as $LaMnO_3$, $LaSrMnO_3$, $LaSrMnFeO_3$, $LaCaMnFeO_3$, $LaSrCoFeO_3$, $LaCaCoFeO_3$, $LaBaCoFeO_3$, $LaSrNiO_3$, $LaSrNiFeO_3$, $LaCaNiFeO_3$, $LaCaCrO_3$, $LaCaCrFeO_3$, $LaBaCrFeO_3$, $LaSrCrO_3$, and $LaSrCrFeO_3$.

In other words, perovskite type oxides, expressed as $ABO_3$, that use La for the A site, part of which is substituted by, for example, Sr, Ca, or Ba as necessary, and further use Co, Mn, Cr, Ni or the like for the B site, part of which is substituted by Fe as necessary, are shown as examples of the above ceramic.

To keep high conductivity, the interconnector 24 is required to be dense, and particles having a relatively small particle diameter are used to form the interconnector 24. The average particle diameter of the ceramic particles is preferably 5 μm or less (e.g., 0.01 μm or greater), in which case the dense (non-porous) interconnector 24 whose pores between particles are filled can easily be formed by high-temperature firing.

The interconnector 24 can be formed by methods such as doctor blading, rolling, pressing, casting, ink jetting, slurry coating, and printing. With the slurry coating method, for example, slurry is prepared by adding ceramic particles, which are the raw material for the interconnector 24, to a solution consisting of a mixture of alcohol, a dispersant, and a binder, and the tubular porous member 41 (hereinafter, referred to as a "target member"), on the outer surface of which the positive electrode layer 2 is formed, is dipped in the slurry stored in a container. In the present embodiment in which the interconnector 24 is formed on the outer surface of the target member, cap members are mounted on opposite end faces of the target member, and regions other than a region where the interconnector 24 is to be formed are covered with a masking tape or the like. Note that, depending on the design of the metal-air battery 1, the interconnector may be formed on a plate-like target member.

In the preparation of the slurry, ethanol or the like can be used as the above alcohol, and not only pure ethanol but also a mixed solvent consisting primarily of ethanol may be used. The dispersant is preferably an organic solvent that does not readily volatilize, and for example, 2-(2-n-Butoxyethoxy) ethyl acetate or the like can be used, for example. One example of the binder is ethyl cellulose, and the amount of binder added is preferably in a range of 2.5 to 7.0 percent by mass (wt %). The viscosity of the slurry is adjusted with the amount of ceramic particles added and the amount of binder added.

The amount of ceramic particles added to the solution is preferably in a range of 20 to 40 wt %. When the amount of ceramic particles added is less than 20 wt %, the amount of ceramic particles applied by a single dipping decreases, and depending on the thickness of the interconnector 24, dipping and drying need to be repeated a large number of times. When the amount of ceramic particles added is greater than 40 wt %, the amount of ceramic particles applied by a single dipping increases, but yields may be reduced due to cracking during drying. The viscosity of the slurry is preferably in a range of 100 to 500 centipoises (cP). When the viscosity of the slurry is lower than 100 cP, the amount of ceramic particles applied by a single dipping decreases, and depending on the thickness of the interconnector 24, dipping and drying need to be repeated a large number of times. When the viscosity of the slurry is higher than 500 cP, the amount of ceramic particles applied by a single dipping increases, but yields may be reduced due to cracking during drying.

The target member to which the slurry is applied is dried at a temperature in a range of ambient temperature to 40° C. for 30 minutes or longer and then dried at a temperature in a range of 60 to 100° C. for 90 minutes or longer to remove the solvent. By repeating the dipping and the drying several times, a slurry layer of the desired thickness (the layer consists primarily of ceramic particles and is thus hereinafter referred to as a "ceramic particle layer") is formed. The thickness of the ceramic particle layer is preferably in a range of 30 to 300 µm. When the thickness of the ceramic particle layer is less than 30 µm, resistance in the interconnector 24 increases, and smoothness of the surface of the interconnector 24 degrades. When the thickness of the ceramic particle layer is greater than 300 µm, yields may be reduced due to cracking during firing, which will be described later. Note that, when the amount of ceramic particles applied by a single dipping is small relative to the thickness of the desired ceramic particle layer, the binder may be removed by high-temperature firing, and the application and firing of the slurry may be repeated multiple times.

The ceramic particle layer is preferably formed in consideration of changes in size due to firing so that the interconnector 24 is formed within a range of angles from 0.1° to 180° centered on the central axis of the target member (the central axis J1 of the metal-air battery 1) on the outer surface of the target member. That is, as illustrated in FIG. 2, an angle θ formed by two lines that respectively connect the central axis J1 and one and the other ends of the interconnector 24 in the circumferential direction centered on the central axis J1 preferably satisfies (0.1°≤θ≤180°). A more preferable interconnector 24 satisfies (0.1°≤θ≤60°).

When the metal-air battery 1 has a small diameter, the angle θ is preferably 10° or more. From the viewpoint of securing the effective area of the positive electrode layer 2 (the area through which air is taken in), the angle θ is preferably small. The diameter of the target member is, for example, greater than or equal to 10 mm and less than or equal to 300 mm. In the present embodiment, the diameter is 16 mm. When the diameter of the target member is 300 mm, the circumferential width of the interconnector 24 is 0.26 mm, where θ=0.1°. The ceramic particle layer with such a width can be formed by methods such as ink jetting and screen printing.

When the target member is fired, burrs are preferably removed in advance from the ceramic particle layer. This prevents the occurrence of cracking. The firing temperature of the target member is, for example, in a range of 1000 to 1500° C., and the holding time of the firing temperature is preferably in a range of approximately one to five hours. The firing conditions vary depending on, for example, the type of ceramic particles and the average particle diameter, and therefore, conditions under which the dense interconnector 24 can be obtained are appropriately selected.

Next, the liquid repellent layer 29 will be described in detail. In the formation of the liquid repellent layer 29, a water repellent material is applied to the outer surface of the target member by a wet process such as slurry coating or spray coating. As the water repellent material, for example, fine particles of fluororesin (fluorine-based fine particles) can be used, which include at least one out of polytetrafluoroethylene (PTFE), tetrafluoroethylene-perfluoroalkylvinylether copolymer (PFA), tetrafluoroethylene-hexafluoropropylene copolymer (FEP), tetrafluoroethylene-hexafluoropropylene-perfluoroalkylvinylether copolymer (EPE), polychloro-trifluoroethylene (PCTFE), ethylene-tetrafluoroethylene copolymer (ETFE), and ethylene-chlorotrifluoroethylene copolymer (ECTFE).

The above fine particles of fluororesin are dispersed along with a surfactant in a liquid dispersion medium to prepare a dispersion (fluid dispersion). Here, polyethylene oxide is added as a thickener to the dispersion to adjust the viscosity of the dispersion. The added amount of fine particles of fluororesin is preferably in a range of 10 to 40 wt %. When the added amount of fine particles of fluororesin is less than 10 wt %, a uniform liquid repellent layer 29 cannot be formed due to a lack of amount of fine particles of fluororesin, and the anti-water pressure characteristics degrade. When the added amount of fine particles of fluororesin is greater than 40 wt %, cracking of the liquid repellent layer 29 or delamination of the interconnector 24 and the liquid repellent layer 29 easily occurs. The amount of the thickener added is preferably in the range of 0 to 4 wt %. When the amount of thickener added is greater than 4 wt %, the viscosity of the dispersion becomes too high, and cracking and delamination of the liquid repellent layer 29 easily occur. When the fine particles of fluororesin are applied by slurry coating, uniformity degrades. In addition, the liquid repellent layer increases in thickness and degrades in gas permeability. The viscosity of the dispersion is preferably in a range of 1 to 1000 cP, and more preferably is in a range of 5 to 500 cP.

The surfactant is, for example, a nonionic polymer having a molecular weight of 1000 or more. This nonionic polymer surfactant preferably has little influence on the degree of dispersion of the fine particles of fluororesin. The nonionic polymer surfactant preferably has less influence on the dispersibility of fluorine resin-based particles. For example, one or a mixture of two or more selected from polyoxyethylene alkyl ethers, polyoxy alkylene derivatives, polyoxyethylene sorbitan fatty acid esters, polyoxyethylene sorbitol fatty acid esters, polyoxyethylene fatty acid esters, polyoxyethylene hydrogenated castor oils, polyoxyethylene alkylamines, and polyoxyethylene alkyl alkanolamide is contained as the above nonionic polymer surfactant in the dispersion.

By using the above dispersion with a wet process such as slurry coating or spray coating, a layer of the dispersion (hereinafter, referred to as a "dispersion layer") can easily be formed on (applied to) the surface of the target member. Note that the dispersion does not necessarily have to contain a nonionic polymer surfactant. Also, the dispersion may contain a cationic surfactant or an anionic surfactant in addition to the nonionic polymer surfactant.

In the present embodiment in which the liquid repellent layer 29 is formed on the outer surface of the tubular target member on which the interconnector 24 is formed, cap members are mounted on the opposite end faces of the target member, and a central portion (a portion excluding the edge portions 241) of the interconnector 24 is covered with a masking tape or the like. At this time, the edge portions 241 of the interconnector 24 are exposed. Then, the target member is dipped in the dispersion stored in the container, and the dispersion adheres to a region of the outer surface of the target member, excluding the interconnector 24, and to the edge portions 241 of the interconnector 24. In the case of using a plate-like target member, the main surface on the side opposite to the surface on which the interconnector 24 is formed is also covered with a masking tape or the like.

The target member on which the dispersion layer is formed is dried at around ambient temperature and then further dried at, for example, 80° C. The drying time at around ambient temperature is approximately an amount of time for which liquid dripping is eliminated, and is for example approximately 30 minutes. The drying at 80° C. is for causing moisture contained in the target member to evaporate as slowly as possible, and it is also possible to dry the target member more gradually at a temperature lower than 80° C. The drying time at 80° C. is preferably two hours or more.

The firing of the target member that has gone through the drying process is preferably conducted at a processing temperature that is higher than or equal to a temperature lower by 100° C. than the melting point of the fine particles of fluororesin and that is lower than or equal to a temperature higher by 70° C. than the melting point of the fine particles of fluororesin. When the processing temperature (firing temperature) is higher than or equal to a temperature lower by 100° C. than the melting point of the fine particles of fluororesin, the amount of time required from the start of heating to the fusion of the fine particles of fluororesin can relatively be shortened, and the amount of time required to manufacture the liquid repellent layer 29 can also be shortened. When the processing temperature is lower than or equal to a temperature higher by 70° C. than the melting point of the fine particles of fluororesin, a porous structure can easily be controlled to achieve the desired average pore diameter. Applying fine particles of fluororesin to the surface of the positive electrode layer 2 on which the interconnector 24 is formed and firing the fine particles as described above allows the liquid repellent layer 29 to be formed with a porous structure.

When the fluorocarbon resin is FEP whose melting point is 260° C., the processing temperature is preferably higher than or equal to 160° C. and lower than or equal to 330° C. When fluorocarbon resin is PTFE whose melting point is 327° C., the processing temperature is preferably higher than or equal to 227° C. and lower than or equal to 397° C. The melting point of PFA is 310° C., the melting point of PCTFE is 220° C., the melting point of ETFE is 270° C., and the melting point of ECTFE is 245° C. In the case of using each material, a processing temperature within a range of temperatures based on the melting point of the material is employed. The above processing temperature is more preferably higher than or equal to a temperature lower by 80° C. than the melting point of the fine particles of fluororesin and is lower than or equal to a temperature higher by 60° C. than the melting point of the fine particles of fluororesin, and yet more preferably is higher than or equal to a temperature lower by 60° C. than the melting point of the fine particles of fluororesin and is lower than or equal to a temperature higher by 50° C. than the melting point of the fine particles of fluororesin.

The rate of temperature increase during the firing process is preferably in a range of 0.1 to 10° C. per minute (i.e., 0.1 to 10° C./min). If the rate of temperature increase is greater than 10° C./min, cracking or delamination may occur and cause yields to decrease. If the rate of temperature increase is less than 0.1° C./min, the firing process requires an excess amount of time. The rate of temperature increase is more preferably in a range of 0.5 to 5° C./min.

From the viewpoint of reliably superimposing the liquid repellent layer 29 on the opposite edge portions 241 of the interconnector 24, the width in a width direction at which the liquid repellent layer 29 overlaps with each edge portion 241 of the interconnector 24 (the width indicated by an arrow with a reference sign W in FIG. 3; hereinafter, referred to as an "overlapping width") is preferably greater than or equal to 0.1 mm and less than or equal to 2.9 mm, and is more preferably greater than or equal to 0.5 mm and less than or equal to 2.5 mm when the overall width of the interconnector 24 in the width direction (the width indicated by an arrow with a reference sign A in FIG. 3) is 6 mm, the width direction being a direction that connects the opposite ends of the interconnector 24 in the circumferential direction. In other words, with respect to the width direction, the ratio (i.e., (2 W/A)) of the width at which the liquid repellent layer 29 overlaps with the interconnector 24 to the overall width of the interconnector 24 preferably satisfies ($0.03 \leq (2 \text{ W}/\text{A}) \leq 0.97$), and more preferably satisfies ($0.17 \leq (2 \text{ W}/\text{A}) \leq 0.83$). When the overlapping width W is less than 0.1 mm (i.e., (2 W/A)<0.03), the liquid repellent layer 29 may be delaminated due to pressure applied from the inner side to the interface between the liquid repellent layer 29 and the interconnector 24. When the overlapping width W is greater than 2.9 mm (i.e., (2 W/A)>0.97), it is difficult to connect the positive electrode current collector terminal 25 to the interconnector 24.

From the viewpoint of securing the area of contact between the interconnector 24 and the positive electrode current collector terminal 25, i.e., reducing electrical resistance at the interface between the positive electrode current collector terminal 25 and the interconnector 24, the overlapping width W is preferably less than or equal to 2.7 mm, and is more preferably less than or equal to 2 mm when the overall width A of the interconnector 24 is 6 mm. In other words, the value (2 W/A) preferably satisfies (($2 \text{ W}/\text{A}) \leq 0.90$), and more preferably satisfies (($2 \text{ W}/\text{A}) \leq 0.67$). Thus, in order to reliably superimpose the liquid repellent layer 29 on the interconnector 24 while reducing electrical resistance at the interface between the positive electrode current collector terminal 25 and the interconnector 24, preferably ($0.03 \leq (2 \text{ W}/\text{A}) \leq 0.90$) is satisfied, and more preferably ($0.17 \leq (2 \text{W}/\text{A}) \leq 0.67$) is satisfied.

As described above, in the metal-air battery 1, the interconnector 24 formed of ceramic having alkali resistance is provided on the surface of the porous positive electrode layer 2 on the side opposite to the surface of the positive electrode layer 2 that is in contact with the electrolyte layer 4. Moreover, the liquid repellent layer 29 having liquid repellency to the electrolyte solution is provided on the surface of the positive electrode layer 2 on which the interconnector 24 is formed, and covers this surface along with the interconnector 24. Thus, the metal-air battery 1 using an alkaline electrolyte solution can easily prevent leakage of the electrolyte solution by the interconnector 24 and the liquid repellent layer 29 while suppressing degradation of the interconnector 24. In addition, the liquid repellent layer 29 that covers the edge portions 241 of the interconnector 24 can more reliably prevent leakage of the electrolyte solution.

Incidentally, if the metal-air battery uses nickel mesh or nickel felt as a current collector, processes such as winding and fixing the nickel mesh or the like are troublesome. In contrast, the use of the interconnector 24 as a current collector can simplify the process of manufacturing the metal-air battery 1 and reduce the manufacturing cost of the metal-air battery 1.

In the metal-air battery 1, the positive electrode layer 2 is disposed on the outer side of the negative electrode layer 3, and the interconnector 24 is formed on the outer surface of the positive electrode layer 2. This allows the interconnector 24 to be formed more easily than in the case where the positive electrode layer is formed on the inner side of the negative electrode layer. In addition, the effective area for taking air in the interior of the metal-air battery 1 can be increased. Moreover, since, in the manufacture of the metal-air battery 1, the liquid repellent layer 29 is formed on the outer surface of the positive electrode layer 2 after the formation of the positive electrode layer 2, it is possible to increase the degree of freedom in selecting the material for the liquid repellent layer 29.

The following describes conditions for producing the interconnector 24. First, in the preparation of slurry for producing an interconnector, SOLMIX (registered trademark) H-37 (produced by Japan Alcohol Trading Co. Ltd.), 2-(2-n-Butoxyethoxy)ethyl acetate (produced by Kanto Chemical Co., Inc.), ethyl cellulose (produced by Tokyo Chemical Industry Co., Ltd.), and particles (powder) of $LaSrCoFeO_3$ having an average pore diameter of 3.7 μm are mixed at a mixing ratio of 75:25:4:40 to obtain slurry for producing an interconnector.

A cylindrical porous alumina support (corresponding to the porous member 41) having an outer diameter of 16 mm, an inner diameter of 12 mm, and a length of 70 mm is prepared, and a perovskite type oxide (corresponding to the positive electrode catalyst layer 23), $LaSrMnCoFeO_3$, is produced by slurry coating on the outer surface of the porous alumina support to produce a target member. Here, the target member is used to evaluate the interconnector (and the liquid repellent layer) and thus a layer corresponding to the positive electrode conductive layer 22 has been omitted. The target member has an average pore diameter of 2.5 μm, and the amount of nitrogen ($N_2$) gas permeated is 2500 $m^3/(m^2·h·atm)$.

Next, a masking tape is applied to a region of the outer surface of the target member, excluding a region that forms an angle θ (see FIG. 2) satisfying ($0.1° ≤ θ ≤ 180°$) and whose length in the direction of the central axis is 60 mm (region where the interconnector 24 is to be formed). The target member is dipped in the slurry stored in the container for one minute and then dried at 35° C. for 30 minutes and at 80° C. for 90 minutes. After the above operations are repeated multiple times, the masking tape is peeled off, and the interconnector is formed on the target member by firing of 4 hours at 1300° C.

Samples A1 to A7 of the interconnector with different circumferential widths and thicknesses as illustrated in FIG. 4 were prepared by changing the circumferential range of application of the masking tape and the number of times the above operations are repeated, and cracking and surface smoothness of the interconnector were evaluated. Interconnectors with no cracking are indicated by a white circle, and interconnectors with cracking are indicated by x. Interconnector with a smooth surface are indicated by a white circle, interconnectors with a relatively smooth surface are indicated by a white triangle, and interconnectors with a non-smooth surface are indicated by x. The samples A1 to A5 had no cracking in the interconnector and had a smooth interconnector surface. The sample A6 did not have a smooth interconnector surface due to the thickness being too thin. The sample A7 had cracking in the interconnector. Accordingly, in order to produce the interconnector 24 with a high yield, the thickness of the interconnector 24 is preferably in a range of approximately 30 to 300 μm.

Next, conditions for producing the liquid repellent layer 29 will be described. In the preparation of a dispersion for producing a liquid repellent layer, a commercially available FEP dispersion was diluted with ion-exchanged water to adjust the FEP density to 10 to 40 parts by weight (wt %). Also, 0 to 4 parts by weight (wt %) of a thickener was added to the diluted FEP dispersion. Next, a partial region of an interconnector having a thickness of approximately 50 μm provided on a target member was covered with a masking tape so that the above (2 W/A) satisfies (0 ≤ (2 W/A) ≤ 0.90). The target member was then dipped in the dispersion stored in the container for one minute and dried at ambient temperature for 30 minutes and at 60° C. for 15 hours. After the above operations were repeated twice, the target member was subjected to firing to form a liquid repellent layer.

Samples B1 to B27 as illustrated in FIG. 5 were produced by adjusting the viscosity of the dispersion based on the FEP density (indicated as "Raw Material" in FIG. 5) and the amount of thickener added and by further controlling the firing conditions and the value (2 W/A). Then, the samples B1 to B27 were evaluated for the gas permeability of the liquid repellent layer using a nitrogen gas permeability test, for the anti-water pressure characteristics of the liquid repellent layer using an anti-water pressure test, and for the presence or absence of cracking and delamination of the liquid repellent layer by visual inspection. Gas permeability of less than 30 $m^3/(m^2·h·atm)$ is indicated by x, gas permeability of greater than or equal to 30 $m^3/(m^2·h·atm)$ and less than 100 $m^3/(m^2·h·atm)$ is indicated by a white triangle, gas permeability of greater than or equal to 100 $m^3/(m^2·h·atm)$ and less than 200 $m^3/(m^2·h·atm)$ is indicated by a white circle, and gas permeability of greater than or equal to 200 $m^3/(m^2·h·atm)$ is indicated by a double white circle. Anti-water pressure characteristics of less than 0.015 MPa (corresponding to water head pressure of 1.5 m) are indicated by x, anti-water pressure characteristics of greater than or equal to 0.015 MPa and less than 0.040 MPa (corresponding to water head pressure of 4 m) are indicated by a white triangle, and anti-water pressure characteristics of greater than or equal to 0.040 MPa and less than 0.060 MPa (corresponding to water head pressure of 6 m) are indicated by a white circle, and anti-water pressure characteristics of greater than or equal to 0.060 MPa (corresponding to water head pressure of 6 m) are indicated by a double white circle. In the evaluation of cracking and delamination, occurrence of cracking or delamination is indicated by x, and non-occurrence of cracking or delamination is indicated by a white circle.

The samples B1 to B21 had excellent gas permeability, excellent anti-water pressure characteristics, and no cracking or delamination. The sample B22 had poor anti-water pressure characteristics because of a low concentration of fluorine compound (FEP). The sample B23 had poor gas permeability because of a high concentration of fluorine compound. The sample B24 had poor gas permeability and poor anti-water pressure characteristics because the firing temperature was too low. The sample B25 had poor anti-water pressure characteristics because the firing temperature was too high. The sample B26 had delamination and poor anti-water pressure characteristics because the overlapping width W was too small. The sample B27 was satisfactory in terms of performance and appearance, but was undesirable because the overlapping width W was too large. As described above, the conditions used to produce the samples B1 to B21 are desirable in order to produce the liquid repellent layer 29 with high gas permeability and high anti-water pressure characteristics with a high yield. Depending on properties such as gas permeability and anti-water pressure characteristics required for the metal-air battery, it is of course possible to use the conditions used to produce the samples B22 to B27.

The above-described metal-air battery 1 can be modified in various ways. The metal-air battery 1 does not necessarily have to have a cylindrical shape and may, for example, have a tubular shape whose cross-section perpendicular to the central axis J1 has a polygonal shape. The negative electrode layer 3 does not necessarily have to have a tubular shape and may have a columnar shape. The positive electrode layer 2 and the negative electrode layer 3 may have a plate-like shape, and in this case, the interconnector 24 and the liquid repellent layer 29 are provided on a main surface of the positive electrode layer 2 on the side opposite to a main surface that is in contact with the electrolyte layer 4.

The metal-air battery 1 does not necessarily have to circulate the electrolyte solution. The interconnector 24 formed of ceramic having alkali resistance can be used in various types of metal-air batteries.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

Reference Signs List

1 Metal-air battery
2 Positive electrode layer
3 Negative electrode layer
4 Electrolyte layer
24 Interconnector
29 Liquid repellent layer
241 Edge portion

The invention claimed is:
1. A metal-air battery comprising:
a negative electrode layer;
a porous positive electrode layer that opposes said negative electrode layer;
an electrolyte layer disposed between said negative electrode layer and said positive electrode layer and containing an alkaline electrolyte solution;
an interconnector formed of ceramic having alkali resistance and provided on part of a surface of said positive electrode layer on a side opposite to a surface of said positive electrode layer that is in contact with said electrolyte layer; and
a liquid repellent layer having liquid repellency to said electrolyte solution and covering, along with said interconnector, the surface of said positive electrode layer on which said interconnector is provided, said liquid repellent layer being formed on a region of the surface of said positive electrode layer, said region not being covered with said interconnector.

2. The metal-air battery according to claim 1, wherein said ceramic forming said interconnector has electrical conductivity of one siemens per centimeter or greater.

3. The metal-air battery according to claim 1, wherein said liquid repellent layer is formed to have a porous structure by applying fine particles of fluororesin to the surface of said positive electrode layer on which said interconnector is provided and by firing the fine particles at a processing temperature that is higher than or equal to a temperature lower by 100° C. than a melting point of said fine particles and that is lower than or equal to a temperature higher by 70° C. than said melting point.

4. The metal-air battery according to claim 1, wherein said liquid repellent layer covers an edge portion of said interconnector.

5. The metal-air battery according to claim 2, wherein said liquid repellent layer is formed to have a porous structure by applying fine particles of fluororesin to the surface of said positive electrode layer on which said interconnector is provided and by firing the fine particles at a processing temperature that is higher than or equal to a temperature lower by 100° C. than a melting point of said fine particles and that is lower than or equal to a temperature higher by 70° C. than said melting point.

6. The metal-air battery according to claim 2, wherein said liquid repellent layer covers an edge portion of said interconnector.

7. The metal-air battery according to claim 3, wherein said liquid repellent layer covers an edge portion of said interconnector.

8. The metal-air battery according to claim 5, wherein said liquid repellent layer covers an edge portion of said interconnector.

* * * * *